H. SMITH.
LATHE DOG.
APPLICATION FILED JAN. 26, 1920.
1,367,284. Patented Feb. 1, 1921.
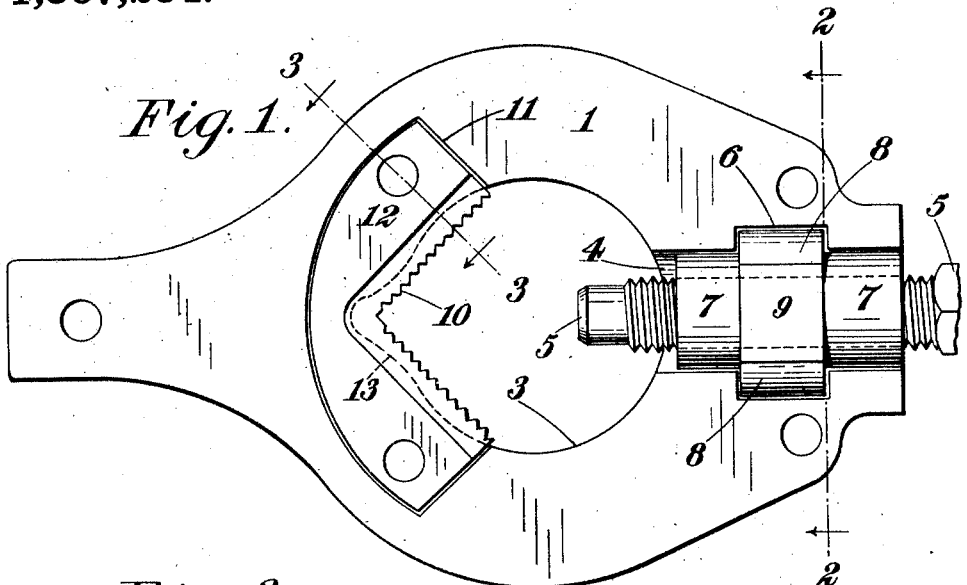
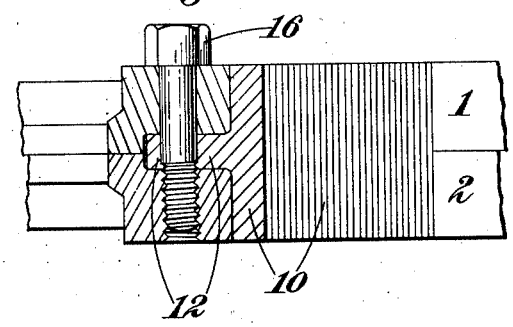
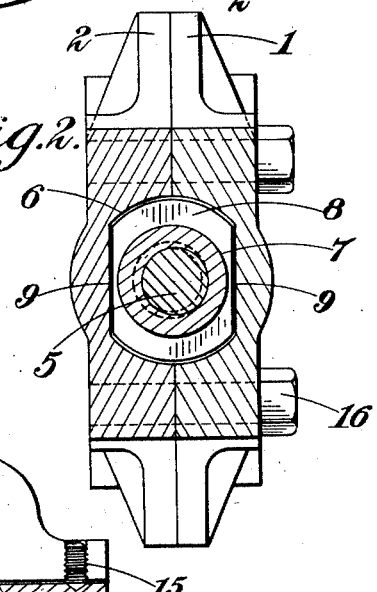
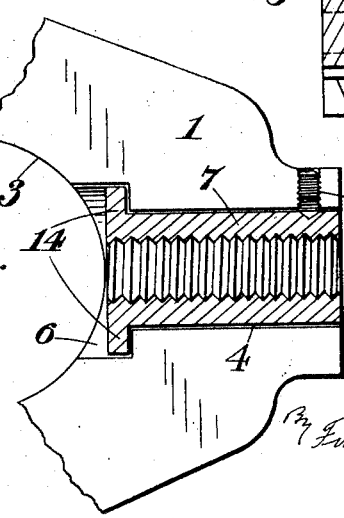
Inventor.
Harry Smith,
By Foster, Freeman, Watson & Coit,
Attorneys.

UNITED STATES PATENT OFFICE.

HARRY SMITH, OF SHEFFIELD, ENGLAND.

LATHE-DOG.

1,367,284. Specification of Letters Patent. Patented Feb. 1, 1921.

Application filed January 26, 1920. Serial No. 354,314.

*To all whom it may concern:*

Be it known that I, HARRY SMITH, a subject of the King of England, residing at Sheffield, England, have invented certain new and useful Improvements in Lathe-Dogs, of which the following is a specification.

This invention relates to lathe dogs and the like of the kind employed to assist in transmitting power from the lathe or other machine to the work, the object of the invention being to provide improvements in the construction of the dog in which parts subject to wear may be easily removed and renewed.

According to the present invention the dog is made in two main parts which are bolted, screwed or otherwise clamped together, the division of the dog being across the axis of the aperture which receives the work to be rotated in the machine. A renewable nut for the clamping set screw is provided and is held between the two main parts of the dog, rotation of the nut in relation to the dog being prevented by wholly or partially inclosing the nut in a suitably shaped enlarged part of a hole partially made in both the two main parts of the dog. When a renewable gripping piece is used it may be provided with a web or flange to be held or clamped between the two main parts of the dog.

In the accompanying drawings:—

Figure 1 is a plan of a dog according to the present invention, one of the two main parts having been removed.

Fig. 2 is a section through the dog on the line 2—2 of Fig. 1.

Fig. 3 is a section through the dog on the line 3—3 of Fig. 1.

Fig. 4 is a similar view to Fig. 1 showing a modification, the nut being shown in section.

Like reference numerals indicate like parts throughout the drawings.

In carrying out the present invention the dog is made in two main parts 1 and 2 which are clamped together by set screws 16, the division of the dog being across the axis of the aperture 3 which receives the work to be rotated in the machine, as seen clearly in Figs. 1 and 2.

The hole 4 for the set screw 5 to clamp the work in the aperture 3 is not tapped as in the ordinary construction of dog but is made sufficiently large for the set screw 5 to pass freely through it. The hole 4 is formed partially in both of the two main parts 1 and 2 of the dog and at a convenient part of its length is enlarged into a recess 6. A renewable tapped nut 7 for the clamping set screw 5 is provided and is inclosed in the hole 4 and recess 6 between the two members 1 and 2. The nut 7 is held against longitudinal movement by means of a collar or the like 8 formed thereon and engaging the recess 6. Rotation of the nut in relation to the dog is prevented by forming the collar 8 with a flat or flats 9 engaging a corresponding flat part of the recess 6.

Although it is preferred thus to make the nut 7 in the form of a tapped bush having a collar 8 it will be understood that if desired the nut may correspond in shape to the recess 6 and be wholly inclosed therein.

A renewable gripping piece 10 may, if desired, also be provided with a dog according to this invention by recessing the two main parts 1 and 2 of the dog around the work carrying aperture 3, on that part of the aperture opposite the clamping screw 5 as shown at 11 in Fig. 1, the dotted line 13 indicating the part of the aperture thus recessed and its shape when the renewable gripping piece is not provided. The gripping piece 10 may be of any desired shape and formation, that part contacting with the work being suitably grooved and shaped in any known manner either as an angle as shown or as an arc of a circle or otherwise. The gripping piece is secured in its recess by forming it with a web or flange 12 entering a continuation of the recess 11 and engaged by the set screws or bolts 16. Or, the web 12 may be formed with a flange or projection engaging a corresponding recess in the dog. Although the web 12 is shown central and the continuation of the recess 11 partially formed in both members 1 and 2, the continuation may be in one of these members only by suitably arranging the position of the web.

In the modification illustrated in Fig. 4 the renewable nut 7 is made in the form of a tapped bush having a head 14 corresponding to the collar 8 and engaging the recess 6, which in this case is made where the hole 4 joins the aperture 3. The tapped bush may be held in place by a grub screw 15 and rotation of the bush in the dog may be prevented either by the grub screw 15 or by suitably shaping the head 14 and recess 6.

Where this construction is employed the dog may be made in one piece provided the bush is not made too long to be inserted into the hole 4 through the aperture 3.

By the employment of the present invention it will be appreciated that when the threads of the set screw 5 and its nut become worn these parts may be easily removed and replaced by a new nut and screw, the operation formerly necessary of boring out the tapped hole in the dog and re-tapping it being thus avoided. Similarly, the gripping piece 10 may also be renewed when desired or replaced by one of different shape.

If desired the dog may be formed to inclose more than one of the clamping screws 5 each with its renewable nut.

The two members 1 and 2 of the dog will conveniently be cast, although in some cases they may be forged, their contacting surfaces being suitably machined.

What I claim and desire to secure by Letters Patent is:—

1. The combination of a lathe dog divided into two main parts across the axis of the work receiving aperture, means for clamping them together, a renewable nut for the clamping set screw inclosed between the said main parts and means for preventing rotation of the nut in relation to the dog substantially as specified.

2. The combination of a lathe dog divided into two main parts across the axis of the work receiving aperture, means for clamping them together, a renewable nut for the clamping set screw inclosed between the said main parts, means for preventing rotation of the nut in relation to the dog and a renewable gripping piece having a web held between the two main parts of the dog substantially as specified.

3. The combination of a lathe dog divided into two main parts across the axis of the work receiving aperture, means for clamping them together, a renewable nut for the clamping set screw in the form of a tapped bush inclosed in a recess partially formed in each of the two main parts and provided with a collar engaging an enlargement of the said recess and means for preventing rotation of the nut in relation to the dog substantially as specified.

4. The combination of a lathe dog divided into two main parts across the axis of the work receiving aperture, means for clamping them together, a renewable nut for the clamping set screw in the form of a tapped bush inclosed in a recess partially formed in each of the two main parts and provided with a collar having a flat face engaging an enlargement of the said recess substantially as specified.

5. The combination of a lathe dog divided into two main parts across the axis of the work receiving aperture, means for clamping them together, a renewable nut for the clamping set screw in the form of a tapped bush inclosed in a recess partially formed in each of the two main parts and provided with a collar having a flat face engaging an enlargement of the said recess and a renewable gripping piece having a web held between the two main parts of the dog substantially as specified.

6. The combination of a lathe dog divided into two main parts across the axis of the work receiving aperture, bolts securing the two main parts of the dog together, a renewable nut for the clamping set screw in the form of a tapped bush inclosed in a recess partially formed in each of the two main parts and provided with a collar having a flat face engaging an enlargement of the said recess and a renewable gripping piece having a web held between the two main parts of the dog and engaged by the securing bolts substantially as specified.

In testimony whereof I have signed my name to this specification in the presence of two subscribing witnesses.

HARRY SMITH.

Witnesses:
PRICE K. EVANS,
ARTHUR H. GREENWOOD.